(12) United States Patent
Testa et al.

(10) Patent No.: US 9,979,482 B2
(45) Date of Patent: May 22, 2018

(54) OPTICAL SOURCE, COMMUNICATIONS NETWORK OPTICAL APPARATUS AND METHOD OF PROVIDING AN OPTICAL SIGNAL

(71) Applicant: Telefonaktiebolaget LM Ericsson (publ), Stockholm (SE)

(72) Inventors: Francesco Testa, Pisa (IT); Antonio D'Errico, Pisa (IT); Ernesto Ciaramella, Pisa (IT); Luca Giorgi, Pisa (IT); Wei-Ping Huang, Stockholm (SE); Marco Presi, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days. days.

(21) Appl. No.: 15/129,312

(22) PCT Filed: Mar. 27, 2014

(86) PCT No.: PCT/EP2014/056151
§ 371 (c)(1),
(2) Date: Sep. 26, 2016

(87) PCT Pub. No.: WO2015/144224
PCT Pub. Date: Oct. 1, 2015

(65) Prior Publication Data
US 2017/0104536 A1    Apr. 13, 2017

(51) Int. Cl.
*H04B 10/25* (2013.01)
*H04B 10/50* (2013.01)
*H04B 10/2569* (2013.01)

(52) U.S. Cl.
CPC ....... *H04B 10/2569* (2013.01); *H04B 10/503* (2013.01)

(58) Field of Classification Search
CPC .................. H04B 10/505; H04B 10/2569
See application file for complete search history.

(56) References Cited

U.S. PATENT DOCUMENTS

| 6,765,723 B1 | 7/2004 | Savory |
| 6,947,129 B1 | 9/2005 | Lu et al. |

(Continued)

OTHER PUBLICATIONS

Unknown, Author, "Optical system design and engineering considerations", ITU-T, Series G: Transmission Systems and Media, Digital Systems and Network, Supplement 39, Sep. 2012, 1-118.

(Continued)

*Primary Examiner* — Shi K Li
(74) *Attorney, Agent, or Firm* — Murphy, Bilak & Homiller, PLLC

(57) ABSTRACT

An optical source (10) comprising: a first laser (12) arranged to generate a first optical signal (14) having a first state of polarization and a first optical frequency; a second laser (16) arranged to generate a second optical signal (18, 48, 78) having a second state of polarization, substantially orthogonal to the first state of polarization, and having a second optical frequency, different to the first optical frequency by a preselected frequency difference, $\Delta v$; a polarization beam coupler (20) arranged to combine the first optical signal and the second optical signal into a composite optical signal comprising both the first optical signal and the second optical signal having said substantially orthogonal states of polarization; and an output (22) arranged to output the composite optical signal (24).

14 Claims, 10 Drawing Sheets

(56) References Cited

U.S. PATENT DOCUMENTS

| | | |
|---|---|---|
| 2003/0090768 A1 | 5/2003 | Liu et al. |
| 2005/0259907 A1 | 11/2005 | Tan et al. |
| 2012/0134676 A1* | 5/2012 | Kikuchi ............... H04B 10/532 398/65 |
| 2013/0028603 A1* | 1/2013 | Chien ................ H04B 10/5051 398/65 |
| 2013/0177316 A1* | 7/2013 | Cardakli ................ H04J 14/06 398/79 |

OTHER PUBLICATIONS

Curti, Franco et al., "Statistical Treatment of the Evolution of the Principal States of Polarization in Single-Mode Fibers", IEEE Journal of Lightwave Technology, vol. 8, No. 8, Aug. 1990, 1162-1166.

Gordon, J.P. et al., "PMD fundamentals: Polarization mode dispersion in optical fibers", PNAS, vol. 97, No. 9, Apr. 25, 2000, 4541-4550.

Narasimha, Adithyaram et al., "An Ultra Low Power CMOS Photonics Technology Platform for H/S Optoelectronic Transceivers at less than $1 per Gbps", Optical Fiber Communication Conference 2010, San Diego, CA, Mar. 21-25, 2010, 1-3.

* cited by examiner

OPTICAL SOURCE, COMMUNICATIONS NETWORK OPTICAL APPARATUS AND METHOD OF PROVIDING AN OPTICAL SIGNAL

TECHNICAL FIELD

The invention relates to an optical source, communications network optical apparatus comprising the optical source, and a communications network base station comprising the optical source. The invention further relates to a method of providing an optical signal to a delivery location.

BACKGROUND

When a continuous wave, CW, optical signal has to be delivered to a single polarization device, SPD, for example an optical modulator, normally either a polarization maintaining fibre, PMF, pigtail is provided on both the device and the laser source to be connected or the laser source is directly integrated in the optical device itself, so that the state of polarisation of the optical signal is fully defined and can easily be aligned with the required polarization direction of the optical device. Connection using PMF has been widely adopted in many applications where the distance between the laser source and the optical device is short, typically up to few meters, because the laser source and the optical device are located in the same hardware module or in the same equipment. The laser integration option has been adopted in a new low cost, silicon photonics parallel optic transceiver reported by A. Narasimha et al, "An Ultra Low Power CMOS Photonics Technology Platform for H/S Optoelectronic Transceivers at less than $1 per Gbps", Proc. OFC 2010, paper OMV4.

In communications network base station optical interconnections between a radio equipment controller, REC, and a radio equipment, RE, the length of the optical link can reach up to 10 Km. In such applications it is convenient to place the laser source for the RE optical modulator in the REC cabinet, where the operating temperature range is controlled by a cooling system, and to supply the optical signal to the optical modulator remotely. If the laser source is coupled to the RE optical modulator using single mode fibre, SMF, a few km long, the state of polarization, SOP, of the optical signal will randomly fluctuate in time due to temperature and external force-induced birefringence variations along the fibre. A polarizer may be provided in front of the RE optical modulator to select the correct polarization component but SOP fluctuations in the SMF can cause large intensity variations to occur at the polarizer output, preventing good performance of a single-polarization device such the RE optical modulator. In this case the use of a long length (up to 10 Km) of PMF may be not acceptable due to the higher cost involved (around 30 times more than using SMF) and the higher attenuation of PMF as compared to SMF. The use of SMF is therefore preferred.

SUMMARY

It is an object to provide an improved optical source. It is a further object to provide an improved communications network optical apparatus. It is a further object to provide an improved communications network base station comprising the optical source. It is a further object to provide an improved method of providing an optical signal to a delivery location.

A first aspect of the invention provides an optical source comprising a first laser, a second laser, a polarisation beam coupler and an output. The first laser is arranged to generate a first optical signal having a first state of polarisation and a first optical frequency. The second laser is arranged to generate a second optical signal having a second state of polarisation and having a second optical frequency. The second state of polarisation is substantially orthogonal to the first state of polarisation, and the second optical frequency is different to the first optical frequency by a preselected frequency difference, $\Delta v$. The polarisation beam coupler is arranged to combine the first optical signal and the second optical signal into a composite optical signal comprising both the first optical signal and the second optical signal having said substantially orthogonal states of polarisation. The output is arranged to output the composite optical signal.

The optical source may generate an optical signal which has an optical power associated with any arbitrary state of polarisation, SOP, that is maintained within a preselected range. In an embodiment, the optical source additionally comprises a feeder optical fibre coupled at one end to the output. The feeder optical fibre has a polarisation mode dispersion coefficient and a length. The preselected frequency difference, $\Delta v$, is inversely proportional to a differential group delay, $\tau$, which is proportional to the polarisation mode dispersion coefficient and the length of the feeder optical fibre.

This may enable an optical signal to be delivered which has an optical power associated with any arbitrary state of polarisation, SOP, that is maintained within a preselected range at the end of a feeder fibre of a preselected length. This may enable the optical signal to be transmitted across up to tens of km of SMF while maintaining the optical power associated with a preselected SOP within a preselected range, which may allow good performance of a single-polarization photonic integrated device provided at the end of the feeder fibre.

In an embodiment, the preselected frequency difference, $\Delta v$, has a value of up to $$\frac{1}{2\pi\tau}.$$

This may ensure that the orthogonality of the first state of polarisation with respect to the second state of polarisation is maintained with a good approximation after any state of polarisation evolution during transmission. By combining the two independent, orthogonal optical signals, having different optical frequencies, and preserving their orthogonal polarization relationship, an optical signal may be delivered for which the optical power associated with any arbitrary SOP is maintained within a preselected range. The optical power of a preselected SOP at the end of the feeder fibre may therefore be maintained within a preselected acceptable optical power range even when there are SOP variations during transmission, for example due to thermal variations in the feeder fibre.

In an embodiment, the preselected frequency difference $\Delta v$, has a value of up to $$\frac{1}{2\pi \cdot a \langle \tau \rangle},$$

where $\langle \tau \rangle$ is an average value of the differential group delay in a single mode optical fibre and a is a Maxwell adjustment factor. Using $\langle \tau \rangle$ and applying a Maxwell adjustment factor, as defined in ITU-T Recommendation Series G Supplement 39, may ensure that the average variation of the optical power associated with any arbitrary SOP is smaller, while the worst case optical signal power variation remains within the preselected range. An optical signal may therefore be delivered which has an optical power associated with any arbitrary state of polarisation, SOP, that is quite stable against any SOP variations during transmission.

In an embodiment, the Maxwell adjustment factor has a value of at least 4. This may ensure that the probability of the instantaneous value of the optical signal power being outside the preselected range is not more than $7.4 \times 10^{-9}$.

In an embodiment, the Maxwell adjustment factor has a value of between 4 and 6. This may ensure that the probability of the instantaneous value of the optical signal power being outside the preselected range is between approximately $1 \times 10^{-11}$ and $7.4 \times 10^{-9}$.

In an embodiment, the composite optical signal has an optical power and $\tau$ is the differential group delay which causes a 1.5 dB variation in the optical power. The worst case optical signal power penalty may therefore be controlled to be 1.5 dB, with a negligible average penalty.

In an embodiment, the polarisation beam coupler has a principle state of polarisation and the first state of polarisation and the second state of polarisation are each rotated by 45 degrees relative to the principle state of polarisation. The polarisation beam coupler is arranged to combine the first optical signal and the second optical signal into two said composite optical signals each comprising a respective component of the first optical signal and a respective component of the second optical signal. The optical source comprises a further output, each said output arranged to output a respective one of the composite optical signals. This may enable two composite optical signals to be delivered using a single optical source, which may reduce the complexity and cost of a communications network comprising the optical source.

In an embodiment, the optical source additionally comprises an optical splitter arranged to receive a said composite optical signal from the polarisation beam combiner. The optical splitter is arranged to power split the composite optical signal into a preselected number of replica composite optical signals. This may enable a plurality of composite optical signals to be delivered using a single optical source, which may reduce the complexity and cost of a communications network comprising the optical source.

In an embodiment, each laser is a distributed feedback laser.

In an embodiment, an output of each laser is coupled to a respective polarisation maintaining optical fibre, PMF, pigtail. The polarisation beam combiner has a first input, a second input and an output. Each input is coupled to a respective input PMF pigtail and the output is coupled to an output PMF pigtail. Each of the PMF pigtails has a fast axis and a slow axis. The PMF pigtail of the first laser is coupled to the fast axis of the PMF pigtail of the first input PMF pigtail of the polarisation beam combiner. The fast axis of the PMF pigtail of the second laser is aligned with the slow axis of the second input PMF pigtail of the polarisation beam combiner.

In an embodiment, the polarisation beam combiner is a micro-optic polarisation beam combiner and has a high extinction ratio, a low optical loss and a broad optical bandwidth.

In an embodiment, the polarisation selective filter is a polariser.

A second aspect of the invention provides communications network optical apparatus comprising an optical source, a polarisation selective optical filter and an optical device. The optical source comprises a first laser, a second laser, a polarisation beam coupler and an output. The first laser is arranged to generate a first optical signal having a first state of polarisation and a first optical frequency. The second laser is arranged to generate a second optical signal having a second state of polarisation and having a second optical frequency. The second state of polarisation is substantially orthogonal to the first state of polarisation, and the second optical frequency is different to the first optical frequency by a preselected frequency difference, $\Delta v$. The polarisation beam coupler is arranged to combine the first optical signal and the second optical signal into a composite optical signal comprising both the first optical signal and the second optical signal having said substantially orthogonal states of polarisation. The polarisation selective optical filter is arranged to receive a said composite optical signal generated by the optical source and is arranged to transmit a portion of the composite optical signal having a preselected state of polarisation. The optical device is arranged to operate at the preselected state of polarisation and is arranged to receive said portion of the composite optical signal transmitted by the polarisation selective optical filter.

The optical source may generate an optical signal which has an optical power associated with any arbitrary state of polarisation, SOP, that is maintained within a preselected range. The communications network optical apparatus may therefore deliver an optical signal to the optical device which has an optical power associated with a preselected SOP which matches the operating SOP of the optical device that is maintained within a preselected range.

In an embodiment, the optical source additionally comprises a feeder optical fibre coupled at one end to the output and at the other end to the polarisation selective optical filter. The feeder optical fibre has a polarisation mode dispersion coefficient and a length. The preselected frequency difference, $\Delta v$, is inversely proportional to a differential group delay, $\tau$, which is proportional to the polarisation mode dispersion coefficient and the length of the feeder optical fibre.

This may enable an optical signal to be delivered, to the polarisation selective optical filter at the end of a feeder fibre of a preselected length, which has an optical power associated with the preselected SOP of the polarisation selective optical filter that is maintained within a preselected range. This may enable the optical signal to be transmitted across up to tens of km of SMF while maintaining the optical power associated with the preselected SOP within a preselected range, which may allow good performance of the optical device. The apparatus may therefore deliver an optical signal which has a preselected SOP that is maintained within a preselected range after a preselected propagation distance in optical fibre (e.g. in SMF), in order to provide an optical signal to an optical device placed far from the optical source while maintaining the optical power associated with the SOP of the optical device within a preselected range.

In an embodiment, the preselected frequency difference, $\Delta v$, has a value of up to $$\frac{1}{2\pi\tau}.$$

This may ensure that the orthogonality of the first state of polarisation with respect to the second state of polarisation is maintained with a good approximation after any state of polarisation evolution during transmission. By combining the two independent, orthogonal optical signals, having different optical frequencies, and preserving their orthogonal polarization relationship, an optical signal may be delivered for which the optical power associated with any arbitrary SOP is maintained within a preselected range. The optical power of a preselected SOP at the end of the feeder fibre may therefore be maintained within a preselected acceptable optical power range even when there are SOP variations during transmission, for example due to thermal variations in the feeder fibre.

In an embodiment, the preselected frequency difference $\Delta v$, has a value of up to $$\frac{1}{2\pi \cdot a \langle \tau \rangle},$$

where $\langle \tau \rangle$ is an average value of the differential group delay in a single mode optical fibre and a is a Maxwell adjustment factor. Using $\langle \tau \rangle$ and applying a Maxwell adjustment factor, as defined in ITU-T Recommendation Series G Supplement 39, may ensure that the average variation of the optical power associated with any arbitrary SOP is smaller, while the worst case optical signal power variation remains within the preselected range. An optical signal may therefore be delivered which has an optical power associated with any arbitrary state of polarisation, SOP, that is quite stable against any SOP variations during transmission.

In an embodiment, the Maxwell adjustment factor has a value of at least 4. This may ensure that the probability of the instantaneous value of the optical signal power being outside the preselected range is not more than $7.4 \times 10^{-9}$.

In an embodiment, the Maxwell adjustment factor has a value of between 4 and 6. This may ensure that the probability of the instantaneous value of the optical signal power being outside the preselected range is between approximately $1 \times 10^{-11}$ and $7.4 \times 10^{-9}$.

In an embodiment, the composite optical signal has an optical power and $\tau$ is the differential group delay which causes a 1.5 dB variation in the optical power. The worst case optical signal power penalty may therefore be controlled to be 1.5 dB, with a negligible average penalty.

In an embodiment, the polarisation beam coupler has a principle state of polarisation and the first state of polarisation and the second state of polarisation are each rotated by 45 degrees relative to the principle state of polarisation. The polarisation beam coupler is arranged to combine the first optical signal and the second optical signal into two said composite optical signals each comprising a respective component of the first optical signal and a respective component of the second optical signal. The optical source comprises a further output, each said output arranged to output a respective one of the composite optical signals. The communications network optical apparatus additionally comprises a further polarisation selective optical filter and a further optical device. This may enable two optical devices to be served by a single optical source, delivering two composite optical signals, which may reduce the complexity and cost of the apparatus.

In an embodiment, the optical source additionally comprises an optical splitter arranged to receive a said composite optical signal from the polarisation beam combiner. The optical splitter is arranged to power split the composite optical signal into a preselected number of replica composite optical signals. The communications network optical apparatus additionally comprises a further polarisation selective optical filter and a further optical device. This may enable a plurality of optical devices to be served by a single optical source, delivering a plurality of composite optical signals, which may reduce the complexity and cost of the apparatus.

In an embodiment, each laser is a distributed feedback laser.

In an embodiment, an output of each laser is coupled to a respective polarisation maintaining optical fibre, PMF, pigtail. The polarisation beam combiner has a first input, a second input and an output. Each input is coupled to a respective input PMF pigtail and the output is coupled to an output PMF pigtail. Each of the PMF pigtails has a fast axis and a slow axis. The PMF pigtail of the first laser is coupled to the fast axis of the PMF pigtail of the first input PMF pigtail of the polarisation beam combiner. The fast axis of the PMF pigtail of the second laser is aligned with the slow axis of the second input PMF pigtail of the polarisation beam combiner.

In an embodiment, the polarisation beam combiner is a micro-optic polarisation beam combiner and has a high extinction ratio, a low optical loss and a broad optical bandwidth.

In an embodiment, the polarisation selective filter is a polariser.

A third aspect of the invention provides a communications network base station comprising an optical source and an optical receiver. The optical source comprises a first laser, a second laser, a polarisation beam coupler and an output. The first laser is arranged to generate a first optical signal having a first state of polarisation and a first optical frequency. The second laser is arranged to generate a second optical signal having a second state of polarisation and having a second optical frequency. The second state of polarisation is substantially orthogonal to the first state of polarisation, and the second optical frequency is different to the first optical frequency by a preselected frequency difference, $\Delta v$. The polarisation beam coupler is arranged to combine the first optical signal and the second optical signal into a composite optical signal comprising both the first optical signal and the second optical signal having said substantially orthogonal states of polarisation. The output is arranged to output the composite optical signal. The optical receiver has an electrical bandwidth and is arranged to receive at least a portion of a said composite optical signal. The preselected frequency difference is greater than twice the electrical bandwidth of the optical receiver.

The optical source may generate an optical signal which has an optical power associated with any arbitrary state of polarisation, SOP, that is maintained within a preselected range. The communications network base station may therefore deliver an optical signal to the optical receiver which has an optical power associated with a preselected SOP which matches the operating SOP of the optical receiver that is maintained within a preselected range. Having a preselected frequency difference greater than twice the electrical bandwidth of the optical receiver may avoid beating noise in the detection of the two components of the composite optical signal.

In an embodiment, the optical source further comprises a polarisation selective optical filter and an optical device. The polarisation selective optical filter is arranged to receive a said composite optical signal generated by the optical source and is arranged to transmit a portion of a said composite optical signal having a preselected state of polarisation. The optical device is arranged to operate at the preselected state of polarisation and is arranged to receive said portion of the composite optical signal transmitted by the polarisation selective optical filter. The optical device is arranged to modify said portion of the composite optical signal and to transmit the modified portion of the composite optical signal. The optical receiver is arranged to receive the modified portion of the composite optical signal.

The communications network base station may therefore deliver an optical signal to the optical device which has an optical power associated with a preselected SOP, which matches the operating SOP of the optical device, that is maintained within a preselected range.

In an embodiment, the communications network base station comprises a radio equipment controller, REC, and radio equipment, RE. The optical source is located in the REC and the polarisation filter and the optical device are located in the RE.

In an embodiment, the optical source additionally comprises a feeder optical fibre coupled at one end to the output and at the other end to the polarisation selective optical filter. The feeder optical fibre has a polarisation mode dispersion coefficient and a length. The preselected frequency difference, $\Delta v$, is inversely proportional to a differential group delay, $\tau$, which is proportional to the polarisation mode dispersion coefficient and the length of the feeder optical fibre.

This may enable an optical signal to be delivered, to the polarisation selective optical filter at the end of a feeder fibre of a preselected length, which has an optical power associated with the preselected SOP of the polarisation selective optical filter that is maintained within a preselected range. This may enable the optical signal to be transmitted across up to tens of km of SMF while maintaining the optical power associated with the preselected SOP within a preselected range, which may allow good performance of the optical device. The apparatus may therefore deliver an optical signal which has a preselected SOP that is maintained within a preselected range after a preselected propagation distance in optical fibre (e.g. in SMF), in order to provide an optical signal to an optical device placed far from the optical source while maintaining the optical power associated with the SOP of the optical device within a preselected range.

In an embodiment, the preselected frequency difference, $\Delta v$, has a value of up to $$\frac{1}{2\pi\tau}.$$

This may ensure that the orthogonality of the first state of polarisation with respect to the second state of polarisation is maintained with a good approximation after any state of polarisation evolution during transmission. By combining the two independent, orthogonal optical signals, having different optical frequencies, and preserving their orthogonal polarization relationship, an optical signal may be delivered for which the optical power associated with any arbitrary SOP is maintained within a preselected range. The optical power of a preselected SOP at the end of the feeder fibre may therefore be maintained within a preselected acceptable optical power range even when there are SOP variations during transmission, for example due to thermal variations in the feeder fibre.

In an embodiment, the preselected frequency difference $\Delta v$, has a value of up to $$\frac{1}{2\pi \cdot a\langle\tau\rangle},$$

where $\langle\tau\rangle$ is an average value of the differential group delay in a single mode optical fibre and a is a Maxwell adjustment factor. Using $\langle\tau\rangle$ and applying a Maxwell adjustment factor, as defined in ITU-T Recommendation Series G Supplement 39, may ensure that the average variation of the optical power associated with any arbitrary SOP is smaller, while the worst case optical signal power variation remains within the preselected range. An optical signal may therefore be delivered which has an optical power associated with any arbitrary state of polarisation, SOP, that is quite stable against any SOP variations during transmission.

In an embodiment, the Maxwell adjustment factor has a value of at least 4. This may ensure that the probability of the instantaneous value of the optical signal power being outside the preselected range is not more than $7.4\times10^{-9}$.

In an embodiment, the Maxwell adjustment factor has a value of between 4 and 6. This may ensure that the probability of the instantaneous value of the optical signal power being outside the preselected range is between approximately $1\times10^{-11}$ and $7.4\times10^{-9}$.

In an embodiment, the composite optical signal has an optical power and $\tau$ is the differential group delay which causes a 1.5 dB variation in the optical power. The worst case optical signal power penalty may therefore be controlled to be 1.5 dB, with a negligible average penalty.

In an embodiment, the polarisation beam coupler has a principle state of polarisation and the first state of polarisation and the second state of polarisation are each rotated by 45 degrees relative to the principle state of polarisation. The polarisation beam coupler is arranged to combine the first optical signal and the second optical signal into two said composite optical signals each comprising a respective component of the first optical signal and a respective component of the second optical signal. The optical source comprises a further output, each said output arranged to output a respective one of the composite optical signals. The communications network optical apparatus additionally comprises a further polarisation selective optical filter and a further optical device. This may enable two optical devices to be served by a single optical source, delivering two composite optical signals, which may reduce the complexity and cost of the apparatus.

In an embodiment, the optical source additionally comprises an optical splitter arranged to receive a said composite optical signal from the polarisation beam combiner. The optical splitter is arranged to power split the composite optical signal into a preselected number of replica composite optical signals. The communications network optical apparatus additionally comprises a further polarisation selective optical filter and a further optical device. This may enable a plurality of optical devices to be served by a single optical source, delivering a plurality of composite optical signals, which may reduce the complexity and cost of the apparatus.

In an embodiment, each laser is a distributed feedback laser.

In an embodiment, an output of each laser is coupled to a respective polarisation maintaining optical fibre, PMF, pigtail. The polarisation beam combiner has a first input, a second input and an output. Each input is coupled to a respective input PMF pigtail and the output is coupled to an output PMF pigtail. Each of the PMF pigtails has a fast axis and a slow axis. The PMF pigtail of the first laser is coupled to the fast axis of the PMF pigtail of the first input PMF pigtail of the polarisation beam combiner. The fast axis of the PMF pigtail of the second laser is aligned with the slow axis of the second input PMF pigtail of the polarisation beam combiner.

In an embodiment, the polarisation beam combiner is a micro-optic polarisation beam combiner and has a high extinction ratio, a low optical loss and a broad optical bandwidth.

In an embodiment, the polarisation selective filter is a polariser.

A fourth aspect of the invention provides a method of providing an optical signal to a delivery location. The method comprises providing a first optical signal having a first state of polarisation and a first optical frequency and providing a second optical signal having a second state of polarisation and a second optical frequency. The second state of polarisation is substantially orthogonal to the first state of polarisation and the second optical frequency is different to the first optical frequency by a preselected frequency difference, $\Delta v$. The method comprises combining the first optical signal and the second optical signal while maintaining the states of polarisation of the first and second optical signals. A composite optical signal comprising both the first optical signal and the second optical signal having said substantially orthogonal states of polarisation is thereby formed. The method comprises transmitting the composite optical signal to the delivery location. The method comprises, at the delivery location, filtering the composite optical signal to select a portion of the composite optical signal having a preselected state of polarisation.

The method may enable an optical signal to be provided which has an optical power associated with any arbitrary state of polarisation, SOP, that is maintained within a preselected range. It will be understood that the preselected state of polarisation may be chosen to be any state of polarisation of the composite optical signal.

In an embodiment, the composite optical signal is transmitted through a feeder optical fibre having a polarisation mode dispersion coefficient and a length. The preselected frequency difference, $\Delta v$, is inversely proportional to a differential group delay, $\tau$, which is proportional to the polarisation mode dispersion coefficient and the length of the feeder optical fibre. This may enable an optical signal to be delivered which has an optical power associated with any arbitrary state of polarisation, SOP, that is maintained within a preselected range at the end of a feeder fibre of a preselected length. This may enable the optical signal to be transmitted across up to tens of km of SMF while maintaining the optical power associated with a preselected SOP within a preselected range, which may allow good performance of a single-polarization photonic integrated device provided at the end of the feeder fibre.

In an embodiment, the preselected frequency difference, $\Delta v$, has a value of up to $$\frac{1}{2\pi\tau}$$

This may ensure that the orthogonality of the first state of polarisation with respect to the second state of polarisation is maintained with a good approximation after any state of polarisation evolution during transmission. By combining the two independent, orthogonal optical signals, having different optical frequencies, and preserving their orthogonal polarization relationship, an optical signal may be delivered for which the optical power associated with any arbitrary SOP is maintained within a preselected range. The optical power of a preselected SOP at the end of the feeder fibre may therefore be maintained within a preselected acceptable optical power range even when there are SOP variations during transmission, for example due to thermal variations in the feeder fibre.

In an embodiment, the preselected frequency difference $\Delta v$, has a value of up to $$\frac{1}{2\pi \cdot a\langle\tau\rangle},$$

where $\langle\tau\rangle$ is an average value of the differential group delay in a single mode optical fibre and a is a Maxwell adjustment factor. Using $\langle\tau\rangle$ and applying a Maxwell adjustment factor, as defined in ITU-T Recommendation Series G Supplement 39, may ensure that the average variation of the optical power associated with any arbitrary SOP is smaller, while the worst case optical signal power variation remains within the preselected range. An optical signal may therefore be delivered which has an optical power associated with any arbitrary state of polarisation, SOP, that is quite stable against any SOP variations during transmission.

In an embodiment, the Maxwell adjustment factor has a value of at least 4. This may ensure that the probability of the instantaneous value of the optical signal power being outside the preselected range is not more than $7.4\times10^{-9}$.

In an embodiment, the adjustment factor has a value of between 4 and 6. This may ensure that the probability of the instantaneous value of the optical signal power being outside the preselected range is between approximately $1\times10^{-11}$ and $7.4\times10^{-9}$.

In an embodiment, the composite optical signal has an optical power and $\tau$ is the differential group delay which causes a 1.5 dB variation in the optical power. The worst case optical signal power penalty may therefore be controlled to be 1.5 dB, with a negligible average penalty.

In an embodiment, the first state of polarisation and the second state of polarisation are each rotated by 45 degrees relative to a preselected principle state of polarisation. The method comprises combining the first optical signal and the second optical signal such that a component of the first optical signal having the principle state of polarisation is combined with a component of the second optical signal having a state of polarisation which is orthogonal to the principle state of polarisation and such that a component of the second optical signal having the principle state of polarisation is combined with a component of the first optical signal having the orthogonal state of polarisation. Two composite optical signals are thereby formed which each comprise a respective component of the first optical signal and a respective component of the second optical signal. This may enable two composite optical signals to be delivered from a single optical source, which may reduce the complexity and cost of operating a communications network.

A fifth aspect of the invention provides a data carrier having computer readable instructions embodied therein. The said computer readable instructions are for providing access to resources available on a processor. The computer readable instructions comprise instructions to cause the processor to perform any of the above steps of the method of providing an optical signal having a preselected state of polarisation.

In an embodiment, the data carrier is a non-transitory data carrier.

Embodiments of the invention will now be described, by way of example only, with reference to the accompanying drawings.

DETAILED DESCRIPTION

Figure 1:
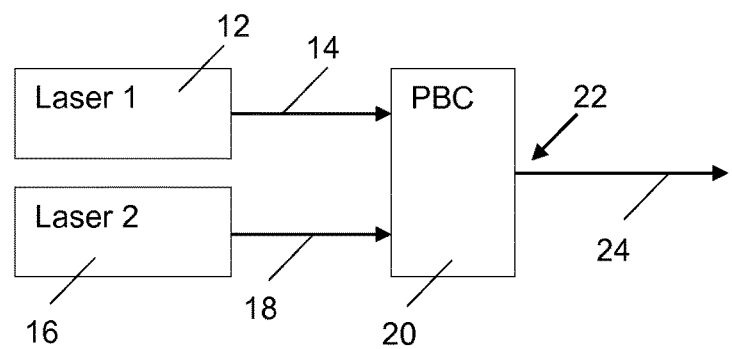
FIG. 1 is a diagrammatic representation of an optical source according to a first embodiment of the invention.

Referring to FIG. 1, a first embodiment of the invention provides an optical source 10 comprising a first laser 12, a second laser 16, a polarisation beam coupler 20 and an output 22.

The first laser 12 is arranged to generate a first optical signal 14 having a first state of polarisation, SOP, and a first optical frequency. The second laser 16 is arranged to generate a second optical signal 18 having a second SOP and a second optical frequency. The second SOP is substantially orthogonal to the first SOP and the second optical frequency is different to the first optical frequency by a preselected frequency difference, $\Delta v$.

The polarisation beam coupler 20 is arranged to combine the first optical signal and the second optical signal into a composite optical signal 24 comprising both the first optical signal and the second optical signal. The resulting composite optical signal is therefore a dual-carrier optical signal. The output 22 is arranged to output the composite optical signal 24.

Figure 2:
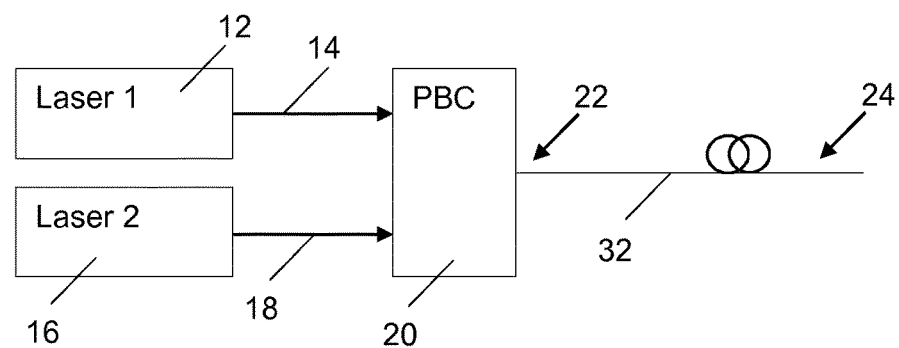
FIG. 2 is a diagrammatic representation of an optical source according to a second embodiment of the invention.

A second embodiment of the invention provides an optical source 30 as shown in FIG. 2. The optical source 30 of this embodiment is similar to the optical source 10 of the first embodiment, with the following modifications. The same reference numbers are retained for corresponding features.

In this embodiment, the optical source 30 additionally comprises a feeder optical fibre 32, which is coupled at one end to the output 22, and has a polarisation mode dispersion, PMD, coefficient and a length. The preselected frequency difference, $\Delta v$, is inversely proportional to a differential group delay, DGD, $\tau$, which the composite optical signal is expected to experience on transmission along the feeder fibre. The DGD that the composite optical signal will experience is proportional to the PMD coefficient and the length of the feeder fibre 32.

In a third embodiment of the invention, described also with reference to FIG. 2, the preselected frequency difference, $\Delta v$, has a value of up to $$\frac{1}{2\pi\tau}.$$

In a fourth embodiment of the invention, described also with reference to FIG. 2, the preselected frequency difference, $\Delta v$, has a value of up to $$\frac{1}{2\pi \cdot a\langle\tau\rangle},$$

where $\langle\tau\rangle$ is an average value of the DGD which the composite optical signal is expected to experience in a single mode optical fibre and a is a Maxwell adjustment factor, as defined in section 10.4 of ITU-T Recommendation Series G Supplement 39.

At the output of the feeder fibre 32 the orthogonality relation between the two optical signal components within the composite optical signal is maintained if the PMD of the feeder fibre does not exceed a given parameter, which can be estimated from the PMD coefficient and length of the feeder fibre.

The orthogonality of two components of the composite optical signal will be affected by the frequency-dependent characteristics of the feeder fibre. Mathematically, this is due to the fact that the Jones matrix of an optical fibre is frequency dependent. In order to maintain the orthogonality of the two components of the composite optical signal with good approximation, we must ensure that $$\tau \cdot \Delta\omega = \tau \cdot 2\pi\Delta\nu \leq 1 \text{ rad (on the Poincare' sphere)} \quad (1)$$

where τ is the differential group delay, DGD, of the feeder fibre, which is distributed according to a Maxwell probability density function, as described by Curti, F. et al, 'Statistical treatment of the evolution of the principal states of polarization in single-mode fibers', J. Lightwave Technol., 1990, 8, (S), pp. 1162-1166.

The condition defined by equation (1) ensures that at the end of the feeder fibre the optical power in a selected SOP remains substantially constant against induced SOP variations, for instance due to thermal cycles of the feeder fibre.

From equation (1) we can extract the maximum value of the frequency difference between the first optical signal and the second optical signal for which the condition remains true:

$$\Delta\nu \leq \frac{1}{2\pi\tau} \quad (2)$$

If we choose, for example, a value $\langle\tau\rangle \approx 0.63$ ps (for a 10 km-long feeder fibre having a 0.2 ps/√km PMD coefficient), it can be seen that if we replace τ by $\langle\tau\rangle$, we would find that Δν should be less than 250 GHz. However such a replacement is not correct since τ is the instantaneous DGD value, while $\langle\tau\rangle$ is the average DGD. As will be well known to the skilled person, the DGD experienced by an optical signal varies randomly according to a Maxwell distribution characterised by the PMD coefficient of the fibre.

In order to obtain proper optical signal power margins we have adopted an approach similar to outage probability. However, rather than using the Maxwell adjustment factors given in Table 10.6 of ITU-T Recommendation Series G Supplement 39 to in relation to the probability of the instantaneous DGD exceeding a preselected maximum value, we are using the Maxwell adjustment factor to account for the probability that an instantaneous degradation of more than 1.5 dB will occur in the optical power of the selected SOP of the composite optical signal at the end of the feeder fibre. 1.5 dB is selected as the maximum acceptable degradation in the optical signal power.

In this example, we use a Maxwell adjustment factor of 6 and replace τ by $6 \cdot \langle\tau\rangle$ in equation (2). This results in a negligible average optical signal power penalty for the selected SOP while the worst case penalty remains at 1.5 dB. The upper value of the frequency difference in this case is approximately 42 GHz.

A larger frequency difference between the first and second optical signals may be used if a higher probability can be tolerated that the maximum optical signal power degradation of 1.5 dB will be exceeded. A Maxwell adjustment factor of at least 4 should be used, with an adjustment factor of between 4 and 6 being preferred, 4 representing a higher probability than 6.

Figure 3:
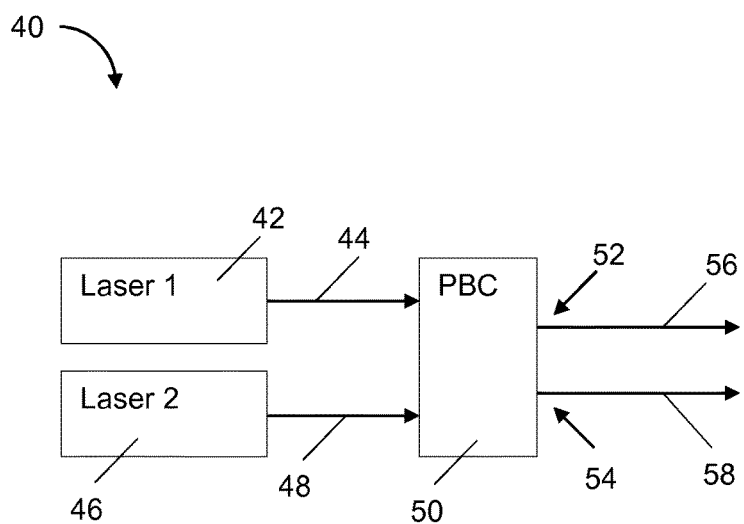
FIG. 3 is a diagrammatic representation of an optical source according to a fifth embodiment of the invention.

An optical source 40 according to fifth embodiment of the invention is shown in FIG. 3. The optical source 40 of this embodiment is similar to the optical source 10 of the first embodiment, with the following modifications.

In this embodiment, the polarisation beam coupler, PBC, 50 has a principle state of polarisation.

The first laser source 42 is arranged to generate a first optical signal 44 having a first optical frequency and a first SOP which is rotated by 45 degrees relative to the principle SOP of the PBC. The second laser source is arranged to generate a second optical signal 48 having a second optical frequency and a second SOP which is also rotated by 45 degrees relative to the principle SOP of the PBC. The second SOP is substantially orthogonal to the first SOP.

The PBC 50 is arranged to combine the first optical signal 44 and the second optical signal 48 into two composite optical signals 56, 58. Each composite optical signal is formed from a respective component of the first optical signal and a respective component of the second optical signal. The first composite optical signal comprises a component of the first optical signal having the principle SOP and a component of the second optical signal having the orthogonal SOP and the second composite optical signal comprises a component of the second optical signal having the principle SOP and a component of the first optical signal having the orthogonal SOP.

The optical source comprises two outputs, 52, 54, each output being arranged to output a respective one of the composite optical signals.

Figure 4:
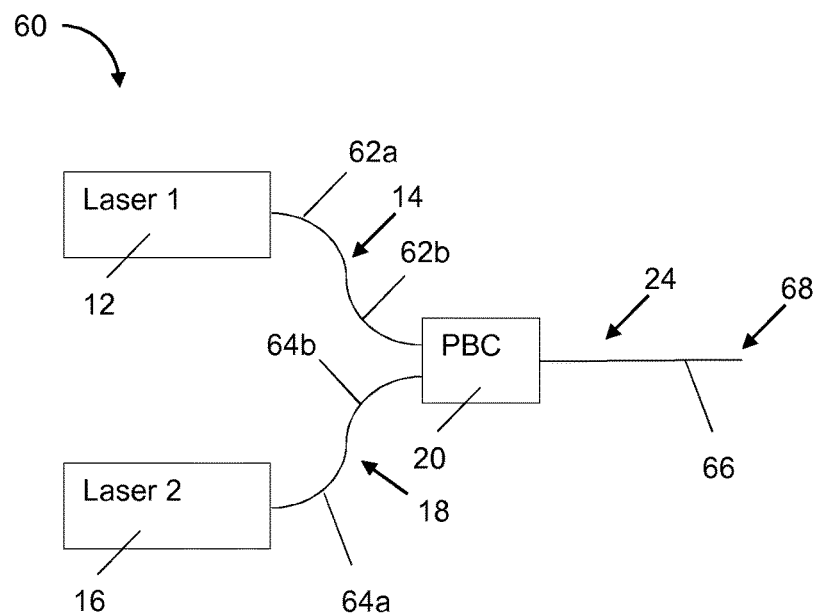
FIG. 4 is a diagrammatic representation of an optical source according to a sixth embodiment of the invention.

An optical source 60 according to a sixth embodiment of the invention is shown in FIG. 4. The optical source 60 of this embodiment is similar to the optical source 10 of the first embodiment, with the following modifications. The same reference numbers are retained for corresponding features.

In this embodiment, each laser 12, 14 has an output PMF pigtail 62a, 64a. The PBC 20 has two inputs, each coupled to a respective input PMF pigtail 62b, 64b, and an output coupled to an output PMF pigtail 66. Each of the PMF pigtails has a fast axis and a slow axis. The PMF pigtail 62a of the first laser 12 is coupled one of the input PMF pigtails 62b of the PBC, and the PMF pigtails are arranged such that the slow axis of the first laser output pigtail 62a is aligned with the fast axis of the said PBC input PMF pigtail 62b. The PMF pigtail 64a of the second laser 14 is coupled the other of the input PMF pigtails 64b of the PBC, and the PMF pigtails are arranged such that the fast axis of the second laser output pigtail 64a is aligned with the slow axis of the said other PBC input PMF pigtail 64b.

Figure 5:
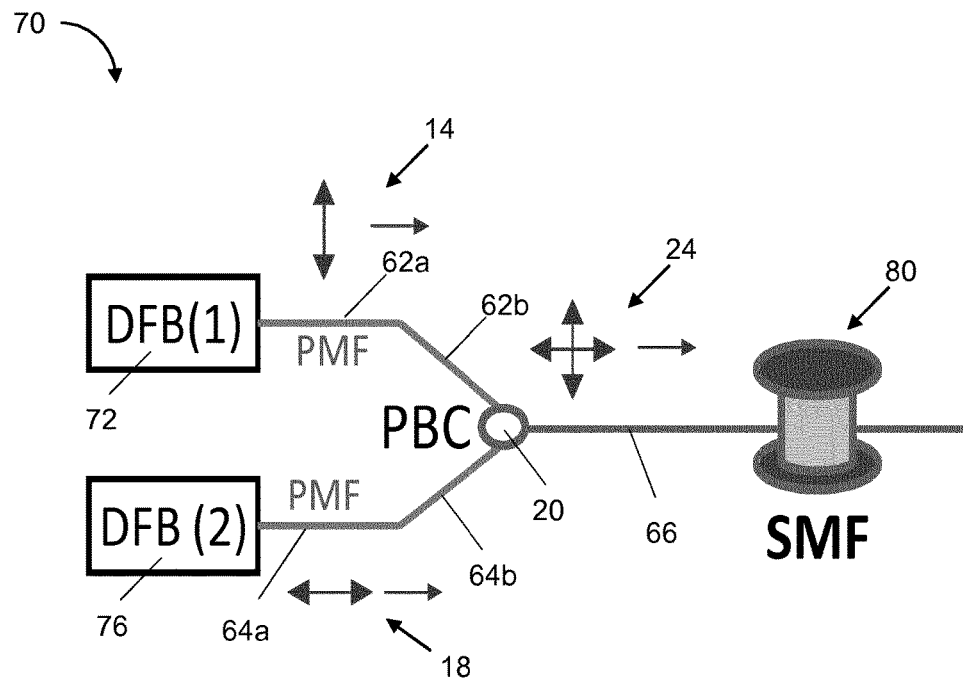
FIG. 5 is a diagrammatic representation of an optical source according to a seventh embodiment of the invention.

An optical source 70 according to a seventh embodiment of the invention is shown in FIG. 5. The optical source 70 of this embodiment is similar to the optical source 60 of the previous embodiment, with the following modifications. The same reference numbers are retained for corresponding features.

In this embodiment, each laser is a DFB laser 72, 76 and the output pigtail 66 of the PBC is coupled to a feeder fibre 80, which here is a single mode fibre, SMF.

Figure 6:
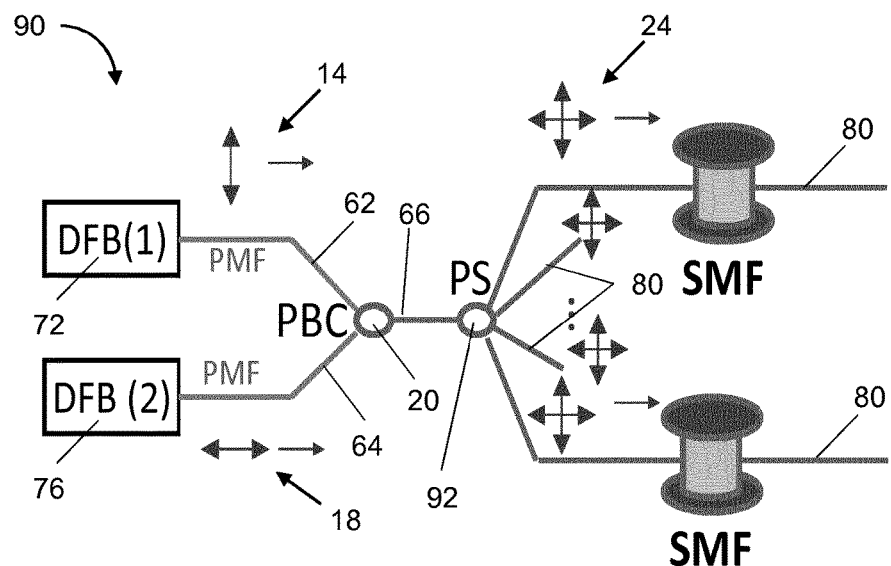
FIG. 6 is a diagrammatic representation of an optical source according to an eighth embodiment of the invention.

An optical source 90 according to an eighth embodiment of the invention is shown in FIG. 6. The optical source 90 of this embodiment is similar to the optical source 70 of the previous embodiment, with the following modifications. The same reference numbers are retained for corresponding features.

In this embodiment, the optical source 90 additionally comprises an optical splitter, PS, 92 coupled to the output pigtail 66 of the PBC 20. The optical splitter has a plurality of outputs each of which is coupled to a respective feeder fibre 80.

The optical splitter is arranged to receive a composite optical signal from the PBC and to power split the composite optical signal into a preselected number of replica composite optical signals, each of which is routed into a respective one of the feeder fibres.

Figure 7:
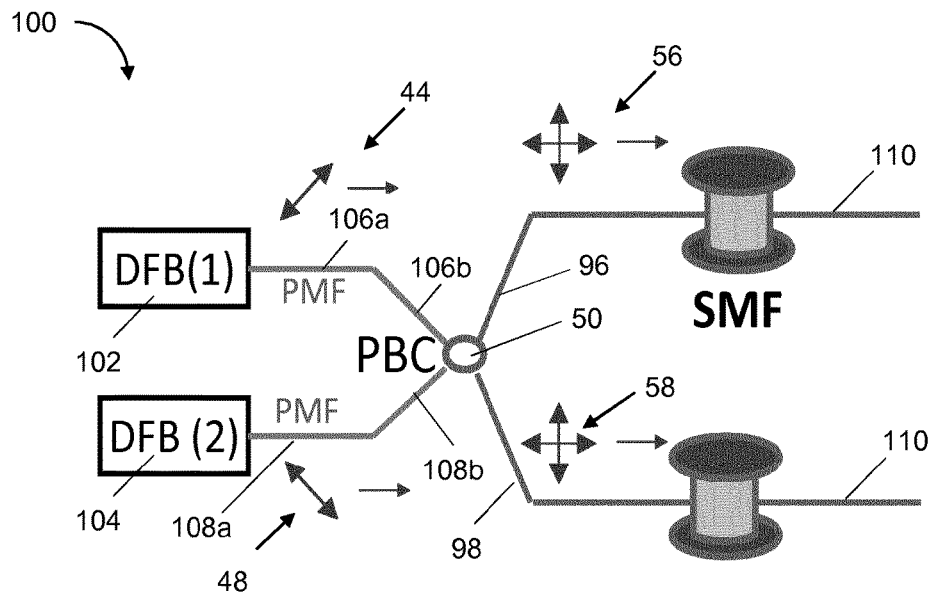
FIG. 7 is a diagrammatic representation of an optical source according to a ninth embodiment of the invention.

An optical source 100 according to a ninth embodiment of the invention is shown in FIG. 7. The optical source 100 of this embodiment is similar to the optical source 40 of the fifth embodiment, shown in FIG. 3, with the following modifications. The same reference numbers are retained for corresponding features.

In this embodiment, each of the lasers is a DFB laser 102, 104 with a respective output PMF pigtail 106a, 108a. The PBC 50 has two inputs, each of which has a respective input PMF pigtail 106b, 108b, and two outputs, each of which has a respective output PMF pigtail 96, 98. Each of the PBC output pigtails are coupled to a respective SMF feeder fibre 110.

Figure 8:
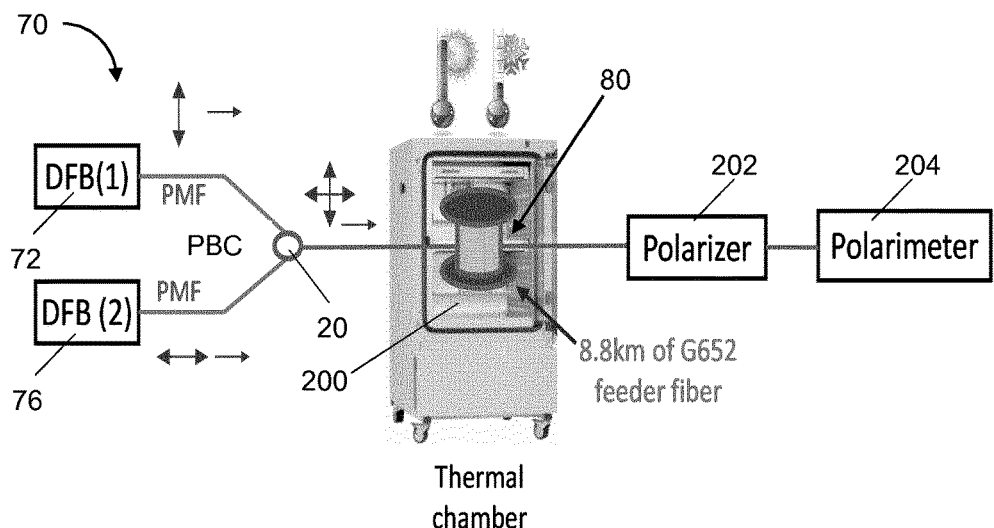
FIG. 8 is a diagrammatic representation of an experimental setup used to test the optical source shown in FIG. 5.

FIG. 8 is a diagrammatic representation of an experimental setup used to test the optical source 70 of the seventh embodiment, shown in FIG. 5.

The feeder fibre 80, which comprised 8.8 km of G652 SMF for the test, is located within a thermal chamber 200 which is arranged to apply a thermal cycle to the feeder fibre 80. This is in order to produce polarization variation of at least one of the first optical signal and the second optical signal within the composite optical signal. A polarizer 202 is provided to transmit a preselected SOP of the composite optical signal to a polarimeter 204. The polarimeter is arranged to measure the amplitude variation of the optical signal transmitted by the polarizer, to thereby measure the optical power variation of the selected SOP of the composite optical signal.

Figure 9:
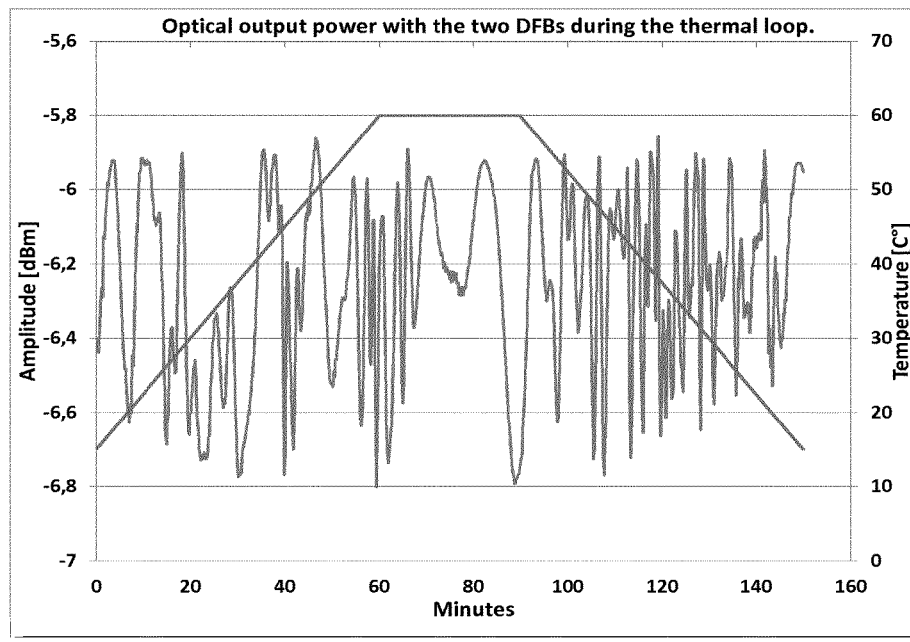
FIG. 9 shows the optical power amplitude variation of a selected state of polarisation of the composite output signal and the thermal cycle (temperature) applied to the feeder optical fibre, as a function of time (minutes)

FIG. 9 shows the amplitude variation of the selected SOP measured by the polarimeter and the corresponding thermal cycle (temperature) applied to the feeder optical fibre, as a function of time (minutes). It can be seen that the power fluctuation of the selected SOP due to the thermally induced polarization evolution in the feeder fibre is less than 1 dB.

Figure 10:
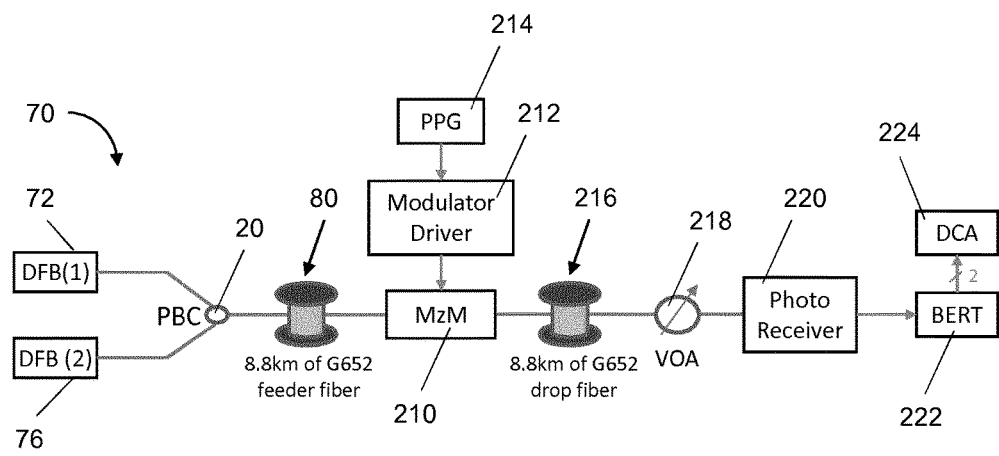
FIG. 10 is a diagrammatic representation of an experimental setup used to test transmission of the composite optical signal output from the optical source shown in FIG. 5.

FIG. 10 is a diagrammatic representation of an experimental setup used to test transmission of the composite optical signal output from the optical source 70 shown in FIG. 5.

The first DFB 72 is an integrateable tuneable laser assembly having a 50 GHz optical frequency tuning step. The second DFB 76 is a tuneable laser having a 100 MHz optical frequency tuning step. The second DFB was chosen to be finely tuneable in order to accurately understand in the lab test the system performance dependence on the frequency difference tuning of the two DFBs. The feeder fibre 80 is 8.8 km of G652 SMF.

A Mach-Zehnder modulator, MzM, 210 is provided at the end of the feeder fibre 80 and is arranged to modulate the amplitude of the composite optical signal with a $2^{31}-1$ pseudo-random binary sequence, PRBS, at 9.953 Gb/s generated by a pulse pattern generator, PPG, 214. A commercial modulator driver 212, with 12.5 GHz of bandwidth, is placed between the PPG and the MzM to adjust the driving radio frequency electrical level.

The output of the MzM 210 is coupled to a drop fibre 216, which here is a further 8.8 km of G652 SMF. The modulated optical signal output from the MzM is detected using a photo-receiver 220, in this case a PIN based photo receiver with a 7.86 GHz electrical bandwidth. A variable optical attenuator, VOA, 218 is placed in front the receiver to allow the optical signal power to be adjusted. The electrical output of the photo-receiver 220 is connected to a bit error rate tester, BERT, 222 and a digital communication analyser, DCA, 224 to analyse the transmission performance.

Figure 11:
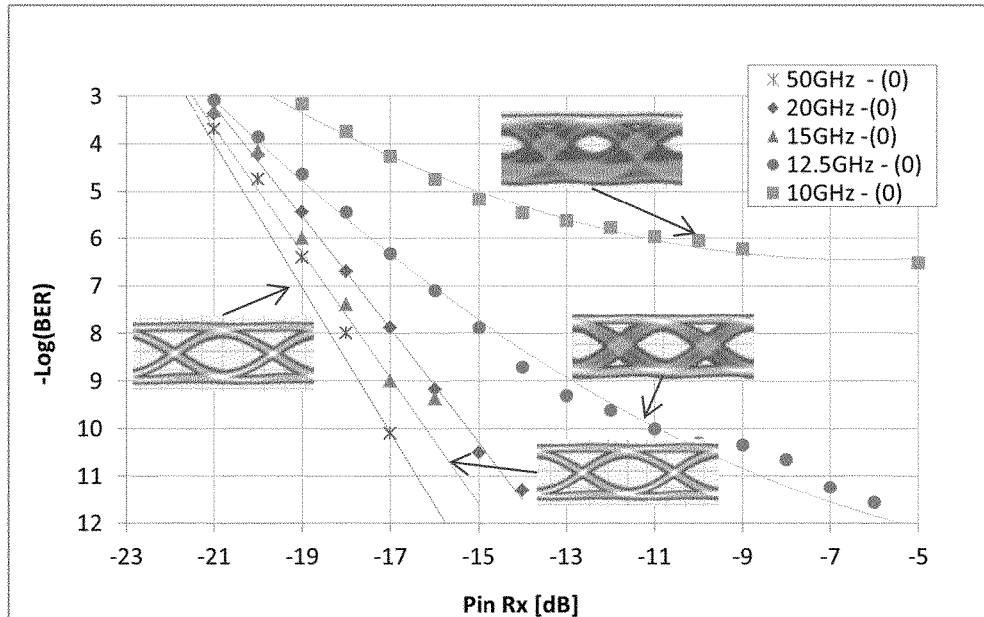
FIG. 11 shows bit error rate (−Log(BER)) as a function of received optical power (Pin Rx (dB)), measured in a back-back arrangement (without the drop fibre) for frequency differences of 10 GHz (squares), 12.5 GHz (discs), 15 GHz (triangles), 20 GHz (diamonds) and 50 GHz (crosses)

FIG. 11 shows bit error rate (−Log(BER)) as a function of received optical power (Pin Rx (dB)), measured in a back-back arrangement (without the drop fibre 216) for frequency differences of: 10 GHz (squares), 12.5 GHz (discs), 15 GHz (triangles), 20 GHz (diamonds) and 50 GHz (crosses). Eye diagrams are also shown for transmission at frequency differences of 10 Ghz, 12.5 GHz, 15 GHz and 50 GHz.

In the back-to-back arrangement, when the frequency difference is reduced to less than 15 GHz the BER performance shows sensible degradation due to beating noise between the first optical signal and the second optical signal during detection by the photo-receiver 220. The performance degradation is also confirmed by the related eye diagrams.

Figure 12:
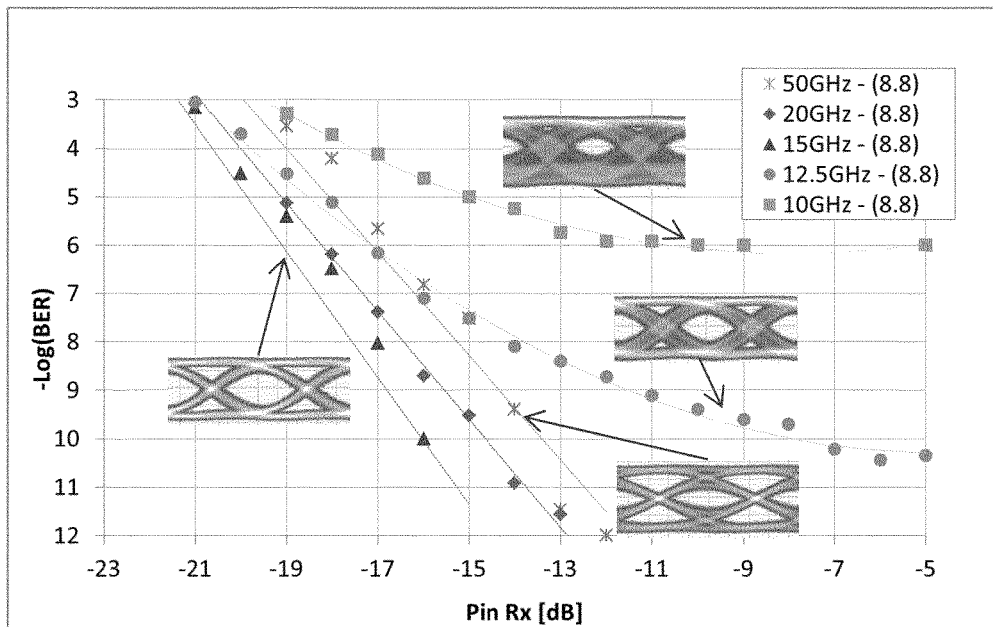
FIG. 12 shows bit error rate (−Log(BER)) as a function of received optical power (Pin Rx (dB)), measured after transmission across the drop fibre for frequency differences of 10 GHz (squares), 12.5 GHz (discs), 15 GHz (triangles), 20 GHz (diamonds) and 50 GHz (crosses)

FIG. 12 shows bit error rate (−Log(BER)) as a function of received optical power (Pin Rx (dB)), measured after transmission across the drop fibre 216 for frequency differences of: 10 GHz (squares), 12.5 GHz (discs), 15 GHz (triangles), 20 GHz (diamonds) and 50 GHz (crosses). Eye diagrams are also shown for transmission at frequency differences of 10 Ghz, 12.5 GHz, 15 GHz and 50 GHz.

After transmission in the drop fibre 216 no propagation effect was seen on the modulated optical signal when the frequency difference is less than 15 GHz; in this case the performance is dominated by the beating noise effect between the first and second optical signals. For a frequency difference of 50 GHz, the eye diagram confirms that chromatic dispersion in the fibres is dominating the system performance.

Figure 13:
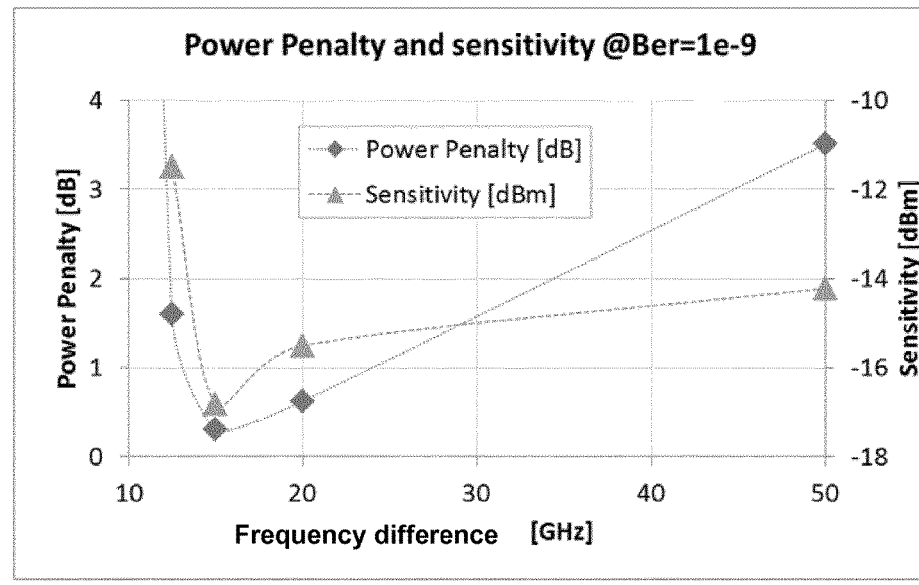
FIG. 13 shows power penalty (dB) and receiver sensitivity (dBm) at a BER of $10^{-9}$ as a function of frequency difference (GHz)

FIG. 13 shows power penalty (dB) and receiver sensitivity (dBm) at a BER of $10^{-9}$ as a function of frequency difference (GHz). The figure shows that, after propagation across the fibres, a frequency difference of 15 GHz offers the best trade-off between performance limitation due to beating noise between the first and second optical signals and performance limitation due to chromatic dispersion. It should be noted that the optical source 70 experiences less than 3 dB of power penalty frequency differences ranging from 12.5 GHz to 40 GHz.

Figure 14:
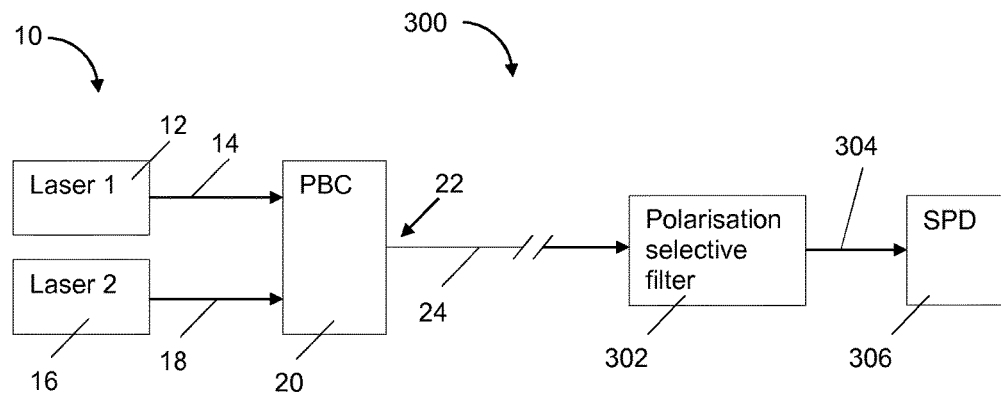
FIG. 14 is a diagrammatic representation of communications network optical apparatus according to a tenth embodiment of the invention.

A tenth embodiment of the invention provides a communications network optical apparatus 300 as shown in FIG. 14.

The communications network optical apparatus 300 comprises an optical source 10, according to the first embodiment, a polarisation selective optical filter 302 and an optical device, SPD, 306. It will be appreciated that the optical source 30, 40, 60, 70, 90, 100 of one of the other previous embodiments may alternatively be used.

The polarisation selective optical filter 302 and the optical device 306 are provided at a location which is remote from the location of the optical source 10. In the embodiments which comprise a feeder fibre 32, 80, 110, this extends between the two locations to connect the optical source to the polarisation selective optical filter.

The polarisation selective optical filter 302 is arranged to receive a composite optical signal 24 generated by the optical source 10. The polarisation selective optical filter 302 is arranged to transmit a portion 304 of the composite optical signal having a preselected SOP.

The optical device 306 is arranged to operate at the said preselected SOP and is arranged to receive the portion of the composite optical signal transmitted by the polarisation selective optical filter.

Figure 15:
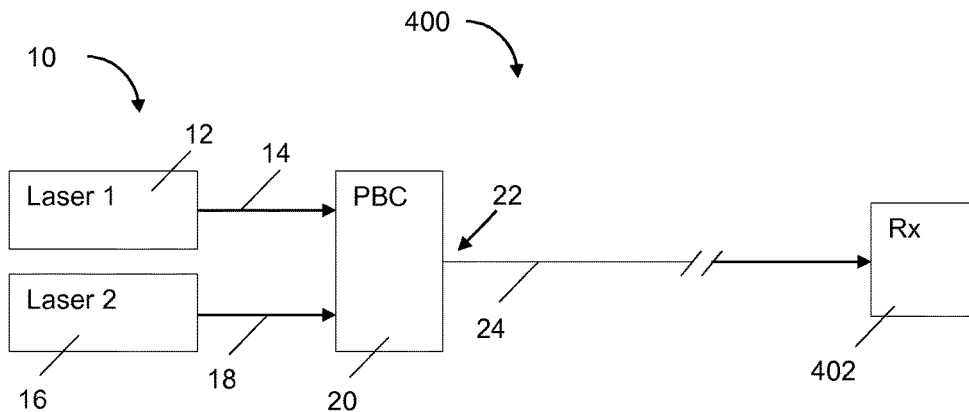
FIG. 15 is a diagrammatic representation of communications network base station according to an eleventh embodiment of the invention.

An eleventh embodiment of the invention provides a communications network base station 400 as shown in FIG. 15.

The communications network base station 400 comprises an optical source 10 according to the first embodiment, as shown in FIG. 1 and an optical receiver 402. It will be appreciated that the optical source 30, 40, 60, 70, 90, 100 of one of the other previous embodiments may alternatively be used.

The optical receiver 402 has an electrical bandwidth and is arranged to receive at least a portion 418 of the composite optical signal generated by the optical source 10.

The preselected frequency difference between the optical frequencies of the first optical signal and the second optical signal is greater than twice the electrical bandwidth of the optical receiver.

Figure 16:
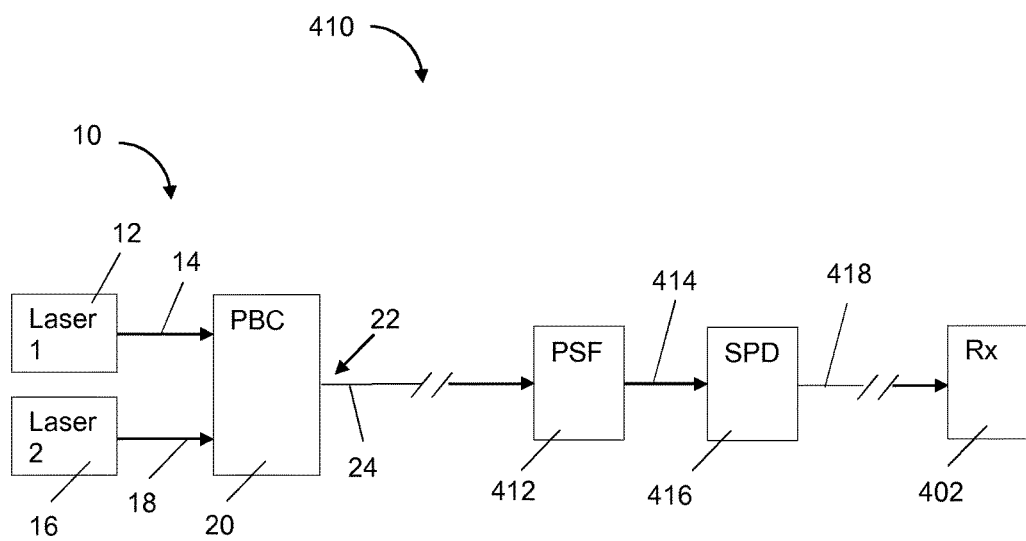
FIG. 16 is a diagrammatic representation of communications network base station according to a twelfth embodiment of the invention.

A communications network base station 410 according to a twelfth embodiment of the invention is shown in FIG. 16. The communications network base station 410 of this embodiment is similar to the communications network base station 400 of the previous embodiment, with the following modifications. The same reference numbers are retained for corresponding features. Again, it will be appreciated that the optical source 30, 40, 60, 70, 90, 100 of one of the other previous embodiments may alternatively be used.

In this embodiment, the optical source further comprises a polarisation selective optical filter 412 and an optical device 416.

The polarisation selective optical filter 412 and the optical device 416 are provided at a location which is remote from the location of the optical source 10. In the embodiments which comprise a feeder fibre 32, 80, 110, this extends between the two locations to connect the optical source to the polarisation selective optical filter. The optical receiver 402 is provided at a location remote from that of the polarisation selective optical filter and the optical device. In the embodiments which comprise a feeder fibre 32, 80, 110, a drop fibre is provided to couple the optical device 416 to the optical receiver 402.

The polarisation selective optical filter 412 is arranged to receive a composite optical signal 24 from the optical source 10. The polarisation selective optical filter 412 is arranged to transmit at a preselected SOP and therefore transmits a portion 414 of the composite optical signal having that SOP.

The optical device 416 is arranged to operate at the SOP of the polarisation selective optical filter. The optical device is arranged to receive the portion of the composite optical signal transmitted by the polarisation selective optical filter, modify that portion of the composite optical signal and transmit the modified portion 418 of the composite optical signal.

The optical receiver 402 is arranged to receive the modified portion of the composite optical signal.

Figure 17:
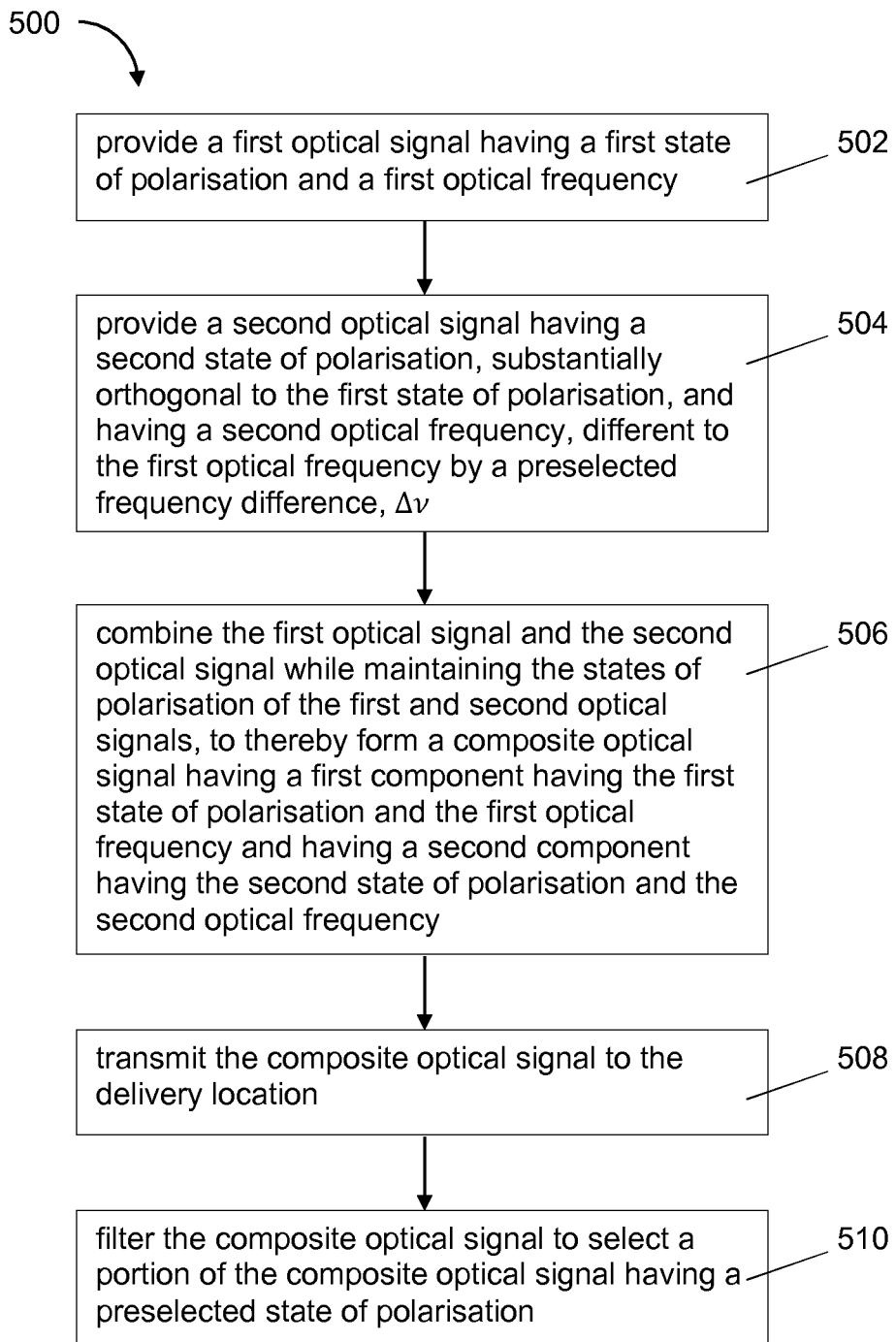
FIG. 17 shows the steps of a method according to a thirteenth embodiment of the invention of providing an optical signal to a delivery location.

Referring to FIG. 17, a thirteenth embodiment of the invention provides a method 500 of providing an optical signal to a delivery location.

The method comprises providing 502 a first optical signal having a first SOP and a first optical frequency. The method additionally comprises providing 504 a second optical signal having a second SOP and a second optical frequency. The second SOP is substantially orthogonal to the first SOP and the second optical frequency is different to the first optical frequency by a preselected frequency difference, $\Delta v$.

The method comprises combining 506 the first optical signal and the second optical signal while maintaining their states of polarisation, to thereby form a composite optical signal comprising both the first optical signal and the second optical signal.

The method comprises transmitting 508 the composite optical signal to the delivery location and, at the delivery location, filtering 510 the composite optical signal to select a portion of the composite optical signal having a preselected SOP.

Figure 18:
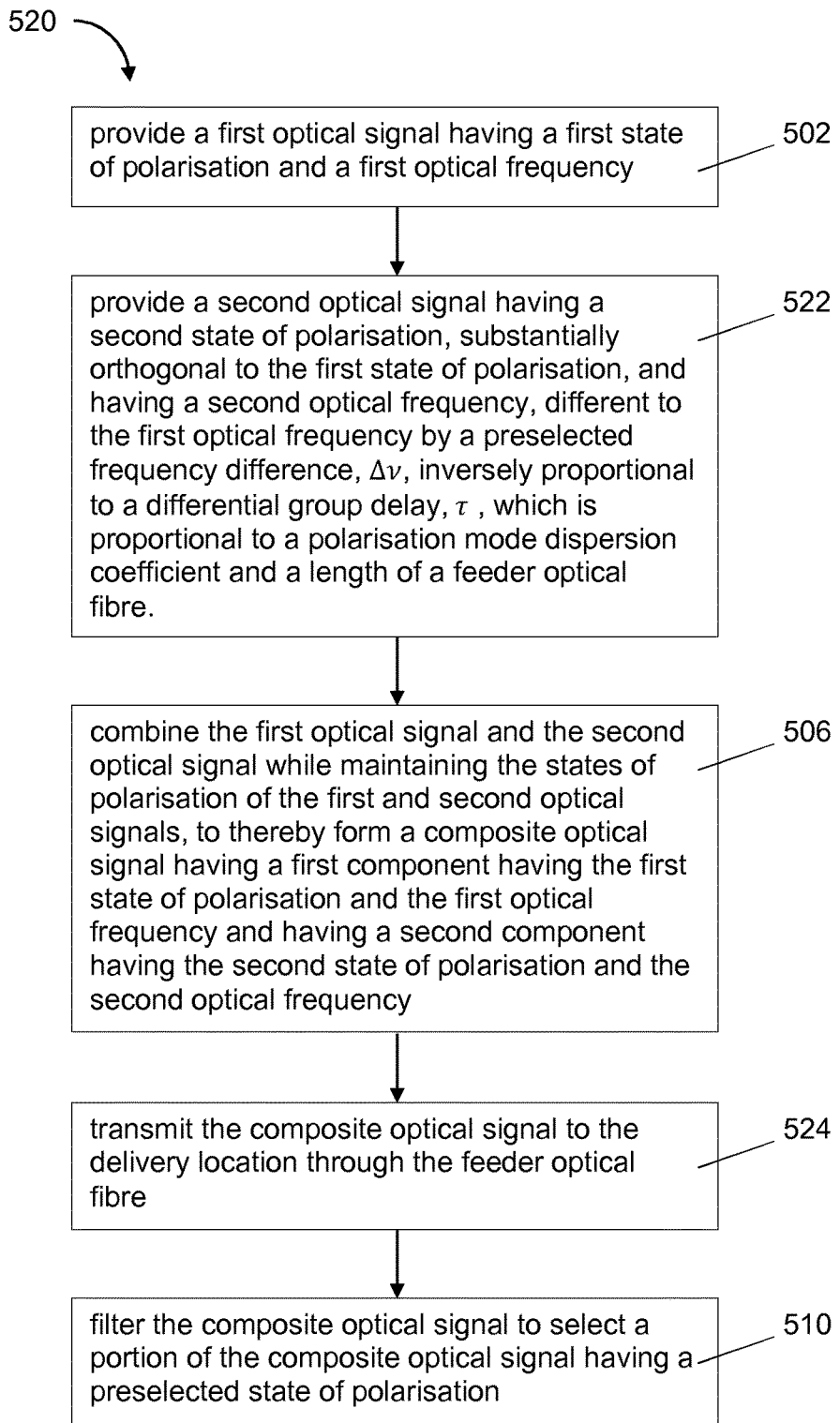
FIG. 18 shows the steps of a method according to a fourteenth embodiment of the invention of providing an optical signal to a delivery location.

Referring to FIG. 18, a fourteenth embodiment of the invention provides a method 520 of providing an optical signal to a delivery location which is similar to the method 500 of the previous embodiment. The same reference numbers are retained for corresponding steps.

In this embodiment, the composite optical signal is transmitted 524 through a feeder optical fibre having a PMD coefficient and a length. The preselected frequency difference, $\Delta v$ is inversely proportional to a differential group delay, $\tau$, which is proportional to the PMD coefficient and the length of the feeder optical fibre 522.

In a fifteenth embodiment of the invention, also described with reference to FIG. 18, the preselected frequency difference, $\Delta v$, has a value of up to $$\frac{1}{2\pi\tau}.$$

In a sixteenth embodiment of the invention, also described with reference to FIG. 18, the preselected frequency difference $\Delta v$, has a value of up to $$\frac{1}{2\pi \cdot a\langle\tau\rangle},$$

where $\langle\tau\rangle$ is an average value of the DGD which the composite optical signal is expected to experience and a is a Maxwell adjustment factor, as defined in section 10.4 of ITU-T Recommendation Series G Supplement 39.

In a seventeenth embodiment of the invention, also described with reference to FIG. 18, a Maxwell adjustment factor of at least 4 is used, with an adjustment factor of between 4 and 6 being preferred, 4 representing a higher probability than 6.

In an eighteenth embodiment of the invention, also described with reference to FIG. 18, the composite optical signal has an optical power and $\tau$ is the differential group delay which causes a 1.5 dB variation in the optical power.

A nineteenth embodiment of the invention provides a data carrier having computer readable instructions embodied therein. The computer readable instructions are for providing access to resources available on a processor. The computer readable instructions comprise instructions to cause the processor to perform any of the steps of the method of providing an optical signal having a preselected state of polarisation, as described above in any of the thirteenth to eighteenth embodiments of the invention.

The data carrier may be a non-transitory data carrier.

The invention claimed is:

1. An optical source comprising:
a first laser arranged to generate a first optical signal having a first state of polarization and a first optical frequency;
a second laser arranged to generate a second optical signal having a second state of polarization, substantially orthogonal to the first state of polarization, and having a second optical frequency, different to the first optical frequency by a preselected frequency difference, $\Delta v$, wherein the preselected frequency difference, $\Delta v$, has a value of up to $$\frac{1}{2\pi\tau},$$

where $\tau$ is a differential group delay;
a polarization beam coupler arranged to combine the first optical signal and the second optical signal into a composite optical signal comprising both the first optical signal and the second optical signal having said substantially orthogonal states of polarization;

an output arranged to output the composite optical signal; and a feeder optical fiber coupled at one end to the output and having a polarization mode dispersion coefficient and a length, and wherein the preselected frequency difference, $\Delta v$, is inversely proportional to the differential group delay, $\tau$, which is proportional to the polarization mode dispersion coefficient and the length of the feeder optical fiber.

2. The optical source of claim 1, wherein the preselected frequency difference $\Delta v$, has a value of up to $$\frac{1}{2\pi \cdot a \langle \tau \rangle},$$

where $\langle \tau \rangle$ is an average value of the differential group delay in a single mode optical fiber and a is a Maxwell adjustment factor.

3. The optical source of claim 2, wherein the Maxwell adjustment factor has a value of at least 4.

4. The optical source of claim 1, wherein the composite optical signal has an optical power and $\tau$ is the differential group delay that causes a 1.5 dB variation in the optical power.

5. The optical source of claim 1, wherein the polarization beam coupler has a principal state of polarization and the first state of polarization and the second state of polarization are each rotated by 45 degrees relative to the principal state of polarization, and wherein the polarization beam coupler is arranged to combine the first optical signal and the second optical signal into two said composite optical signals each comprising a respective component of the first optical signal and a respective component of the second optical signal, and wherein the optical source comprises a further output, each said output arranged to output a respective one of the composite optical signals.

6. A communications network optical apparatus comprising:

the optical source of claim 1;

a polarization selective optical filter arranged to receive a said composite optical signal generated by the optical source and arranged to transmit a portion of the composite optical signal having a preselected state of polarization; and an optical device arranged to operate at the preselected state of polarization and arranged to receive said portion of the composite optical signal transmitted by the polarization selective optical filter.

7. A communications network base station comprising:
the optical source of claim 1; and an optical receiver having an electrical bandwidth and arranged to receive at least a portion of a said composite optical signal, wherein the preselected frequency difference is greater than twice the electrical bandwidth of the optical receiver.

8. The communications network base station of claim 7, the optical source further comprising:

a polarization selective optical filter arranged to receive a said composite optical signal generated by the optical source and arranged to transmit a portion of a said composite optical signal having a preselected state of polarization; and an optical device arranged to operate at the preselected state of polarization and arranged to receive said portion of the composite optical signal transmitted by the polarization selective optical filter and arranged to modify said portion of the composite optical signal and to transmit the modified portion of the composite optical signal, and wherein the optical receiver is arranged to receive the modified portion of the composite optical signal.

9. A method of providing an optical signal to a delivery location, the method comprising:

providing a first optical signal having a first state of polarization and a first optical frequency;

providing a second optical signal having a second state of polarization, substantially orthogonal to the first state of polarization, and having a second optical frequency, different to the first optical frequency by a preselected frequency difference, $\Delta v$;

combining the first optical signal and the second optical signal while maintaining the states of polarization of the first and second optical signals, to thereby form a composite optical signal comprising both the first optical signal and the second optical signal having said substantially orthogonal states of polarization;

transmitting the composite optical signal to the delivery location; and filtering the composite optical signal to select a portion of the composite optical signal having a preselected state of polarization.

10. The method of claim 9, wherein the composite optical signal is transmitted through a feeder optical fiber having a polarization mode dispersion coefficient and a length, and wherein the preselected frequency difference, $\Delta v$, is inversely proportional to a differential group delay, $\tau$, which is proportional to the polarization mode dispersion coefficient and the length of the feeder optical fiber.

11. The method of claim 10, wherein the preselected frequency difference, $\Delta v$, has a value of up to $$\frac{1}{2\pi\tau}.$$

12. The method of claim 11, wherein the preselected frequency difference $\Delta v$, has a value of up to $$\frac{1}{2\pi \cdot a \langle \tau \rangle},$$

where $\langle \tau \rangle$ is an average value of the differential group delay in a single mode optical fiber and a is a Maxwell adjustment factor.

13. The method of claim 12, wherein the adjustment factor has a value of at least 4.

14. The method of claim 9, wherein the composite optical signal has an optical power and $\tau$ is the differential group delay that causes a 1.5 dB variation in the optical power.

* * * * *